US010770951B2

(12) United States Patent
Hirabayashi (10) Patent No.: US 10,770,951 B2
(45) Date of Patent: Sep. 8, 2020

(54) ROTARY APPARATUS AND VEHICLE HAVING AIR CONDITIONING SYSTEM INCLUDING THE ROTATING APPARATUS

(71) Applicant: Minebea Mitsumi Inc., Nagano (JP)

(72) Inventor: Koichiro Hirabayashi, Hirakata (JP)

(73) Assignee: MINEBEA MITSUMI INC., Nagano (JP)

( * ) Notice: Subject to any disclaimer, the term of this patent is extended or adjusted under 35 U.S.C. 154(b) by 311 days.

(21) Appl. No.: 15/620,099

(22) Filed: Jun. 12, 2017

(65) Prior Publication Data

US 2017/0366067 A1    Dec. 21, 2017

(30) Foreign Application Priority Data

Jun. 17, 2016    (JP) ................. 2016-120645

(51) Int. Cl.
| | |
|---|---|
| *H02K 7/116* | (2006.01) |
| *H02K 5/22* | (2006.01) |
| *H02K 11/33* | (2016.01) |
| *H02K 11/00* | (2016.01) |
| *B60H 1/00* | (2006.01) |

(52) U.S. Cl.
CPC ......... *H02K 7/116* (2013.01); *B60H 1/00857* (2013.01); *H02K 5/225* (2013.01); *H02K 11/0094* (2013.01); *H02K 11/33* (2016.01)

(58) Field of Classification Search
CPC ........ H02K 7/116; H02K 11/33; H02K 5/225; H02K 11/0094; B60H 1/00857
USPC .......................................................... 310/71
See application file for complete search history.

(56) References Cited

U.S. PATENT DOCUMENTS

| 10,236,745 | B2* | 3/2019 | Ito ...................... H02K 5/225 |
|---|---|---|---|
| 2003/0000326 | A1 | 1/2003 | Reeb et al. |
| 2006/0055787 | A1 | 3/2006 | Hirota et al. |
| 2006/0096400 | A1 | 5/2006 | Shinmura et al. |
| 2008/0036316 | A1 | 2/2008 | Miyamoto et al. |
| 2009/0295325 | A1* | 12/2009 | Sekine ............. B62D 5/0406 318/646 |
| 2012/0139371 | A1* | 6/2012 | Gottschalk ......... H02K 11/026 310/71 |
| 2013/0194762 | A1 | 8/2013 | Hijikata et al. |
| 2013/0234548 | A1* | 9/2013 | Oishi .................. H02K 5/225 310/71 |

(Continued)

FOREIGN PATENT DOCUMENTS

| EP | 0 551 113 A2 | 7/1993 |
|---|---|---|
| JP | S56-101166 U | 8/1981 |

(Continued)

OTHER PUBLICATIONS

Office Action dated Oct. 1, 2019 for corresponding Japanese Application No. 2016-120645 and English translation.

(Continued)

*Primary Examiner* — Forrest M Phillips
(74) *Attorney, Agent, or Firm* — Pearne & Gordon LLP (57) ABSTRACT

A rotary apparatus includes a motor, a plurality of gears, and a sensor configured to detect a rotation angle of one of the plurality of gears. The sensor includes a first connection terminal electrically connecting to the outside, and a base portion. The first connection terminal is disposed at the base portion. A second connection terminal is disposed at the base portion.

9 Claims, 6 Drawing Sheets

(56) References Cited

U.S. PATENT DOCUMENTS

| | | |
|---|---|---|
| 2014/0361667 A1 | 12/2014 | Bui |
| 2015/0381016 A1* | 12/2015 | Tsuda ..................... H02K 5/225 |
| | | 310/71 |
| 2016/0141979 A1 | 5/2016 | Ninomiya |

FOREIGN PATENT DOCUMENTS

| | | |
|---|---|---|
| JP | 62-198851 U | 12/1987 |
| JP | H01-164002 A | 6/1989 |
| JP | 2001-112211 A | 4/2001 |
| JP | 2001-145298 A | 5/2001 |
| JP | 2004-503196 A | 1/2004 |
| JP | 2004-166320 A | 6/2004 |
| JP | 2006-081006 A | 3/2006 |
| JP | 2008-043109 A | 2/2008 |
| JP | 2008-199590 A | 8/2008 |
| JP | 20-2011-0006298 U | 6/2011 |
| JP | 2013-005512 A | 1/2013 |
| JP | 2013-158104 A | 8/2013 |
| JP | 2015220969 A | 12/2015 |
| JP | 2016-100928 A | 5/2016 |
| KR | 20-2011-0006298 U | 6/2011 |

OTHER PUBLICATIONS

Chinese Office Action dated Jan. 19, 2020 for corresponding Chinese Application No. 201710441911.1 and English translation.

* cited by examiner

ROTARY APPARATUS AND VEHICLE HAVING AIR CONDITIONING SYSTEM INCLUDING THE ROTATING APPARATUS

CROSS REFERENCE TO RELATED APPLICATIONS

This application claims the benefit of Japanese Patent Application No. 2016-120645, filed Jun. 17, 2016, which is hereby incorporated by reference in its entirety.

BACKGROUND

Technical Field

The present disclosure relates to a rotary apparatus and a vehicle having an air conditioning system including the rotary apparatus.

Background

For example, Japanese Patent Laid-Open No. 2015-220969 discloses a motor actuator (rotary apparatus) driving a plurality of doors (louvers) provided in an air passage for flowing air of a vehicle air conditioning system.

In the motor actuator (rotary apparatus) disclosed in JP Unexamined Patent Application Publication No. 2015-220969, a relay terminal is directly connected to a motor terminal. As disclosed in FIG. 4, a fixing portion that is configured to fix the relay terminal by clamping is formed in a lower casing constituting a housing. It is considered that by fixing the relay terminal to the fixing portion, violent vibration of the relay terminal due to vibration is suppressed and connection failure at a portion connecting between the motor terminal and the relay terminal is suppressed.

However, the above described configuration has a problem in that in a case where a fine structure for clamping a thin member such as a relay terminal in a housing is formed, a mold and the like for molding the housing becomes complicated and increases the manufacturing cost.

SUMMARY

The present disclosure is related to providing a rotary apparatus for which an increase in the manufacturing cost of the housing is suppressed, and a vehicle having an air conditioning system including the rotary apparatus.

In accordance with one aspect of the present disclosure, (1) a rotary apparatus includes a motor, a plurality of gears, and a sensor configured to detect a rotation angle of one of the plurality of gears, wherein the sensor includes a first connection terminal electrically connecting to the outside, and a base portion, the first connection terminal is disposed at the base portion, a second connection terminal for the motor is disposed at the base portion.
(2) In the configuration of (1) above, the motor is a DC motor, and the plurality of gears includes a transmission gear for transmitting the rotation of the motor to the one of the plurality of gears.
(3) In the configuration of (1) or (2) above, the base portion includes a terminal arrangement portion, wherein the first connection terminal and the second connection terminal are arranged at the terminal arrangement portion.
(4) In the configuration of any one of (1) to (3) above, the rotary apparatus including a flexible wiring board electrically connecting the motor and the second connection terminal, wherein the second connection terminal includes a connection portion extending in a direction away from the base portion, and the flexible wiring board includes an electrical connection portion having a hole portion engaged with the connection portion.
(5) In the configuration of (4) above, the connection portion is a bent portion, the bent portion is a part in an end part side of the second connection terminal, and the part in the end part side is the bent portion bent in a direction away from the base portion.
(6) In the configuration of (4) or (5) above, the flexible wiring board comprises: one end surface connected to the connection portion of the second connection terminal; other end surface connected to the motor; and an intermediate surface connecting the one end surface to the other end surface, the intermediate surface have a replicated portion.
(7) In the configuration of (6) above, the replicated portion includes a folded structure therein.
(8) In the configuration of any one of (1) to (7) above, the sensor includes: a resistor substrate, a resistor formed at the resistor substrate, and electrically connected to the first connection terminal, a rotary body rotatable together with the plurality of gears, a conductive brush provided at the rotary body and contacting the resistor, and a cover portion opposing the rotary body and forming a sensor housing together with the base portion.
(9) In the configuration of (3) above, the one of the plurality of gears is an output gear, the output gear and the sensor are lined in a direction substantially orthogonal to a direction of a rotary shaft of the motor, and the terminal arrangement portion includes the first connection terminal disposed at a position away from the motor and the second connection terminal disposed at a position close to the motor.
(10) In the configuration of any one of (1) to (9) above, the plurality of gears include a transmission gear and an output gear, and the rotary apparatus includes a housing accommodating the motor, the transmission gear, the output gear, and the sensor.
(11) A vehicle has an air conditioning system including the rotary apparatus having a configuration of any one of (1) to (10) above, and a louver controlled by the rotary apparatus.

The present disclosure can provide a rotary apparatus suppressing an increase in the cost of manufacturing a housing thereof and can provide a vehicle having an air conditioning system including the rotary apparatus.

DETAILED DESCRIPTION

Hereinafter, the modes for practicing the disclosure (hereinafter referred to as "embodiments") will be described in detail with reference to the accompanying drawings.

It should be noted that throughout the description of the embodiments, the same reference numerals or characters are assigned to the same components.

A hole portion to be engaged is referred to as an engaging hole portion, and a projection to be engaged is referred to as an engaging projection.

Figure 1:
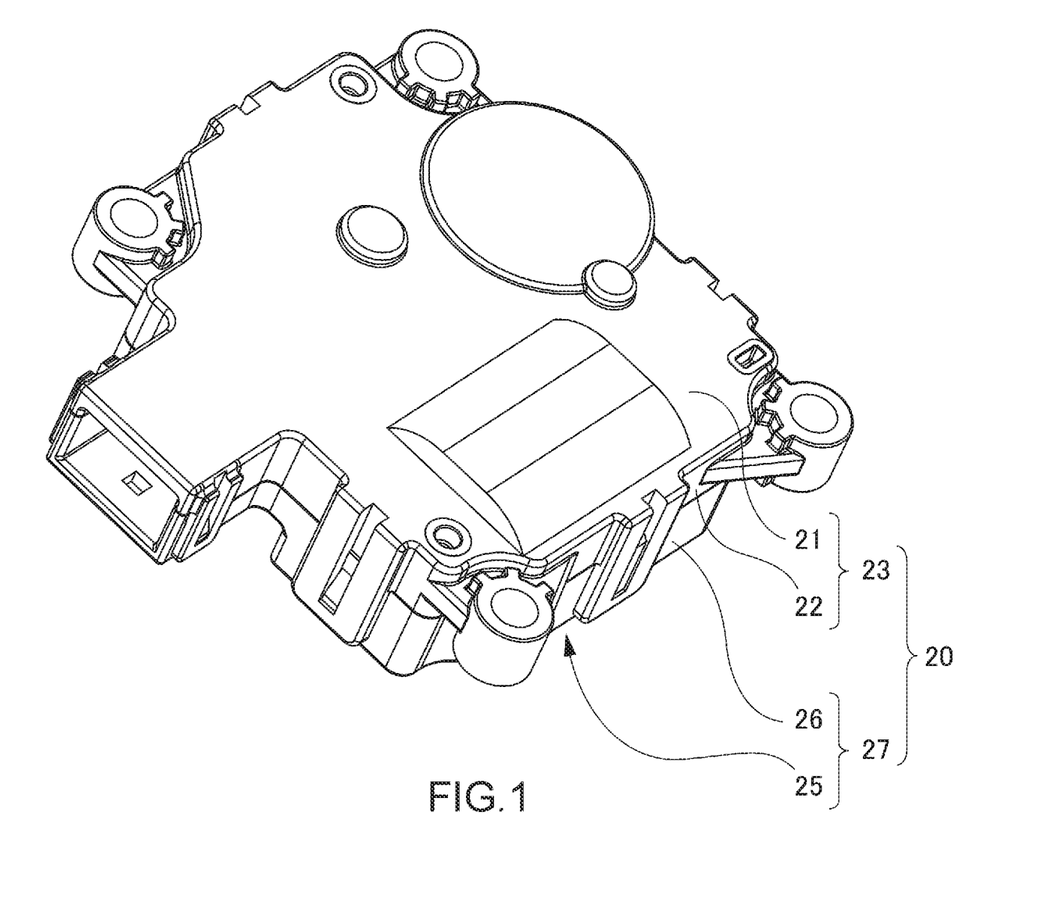
FIG. 1 is a perspective view of a rotary apparatus of an embodiment of the present disclosure.
Figure 2:
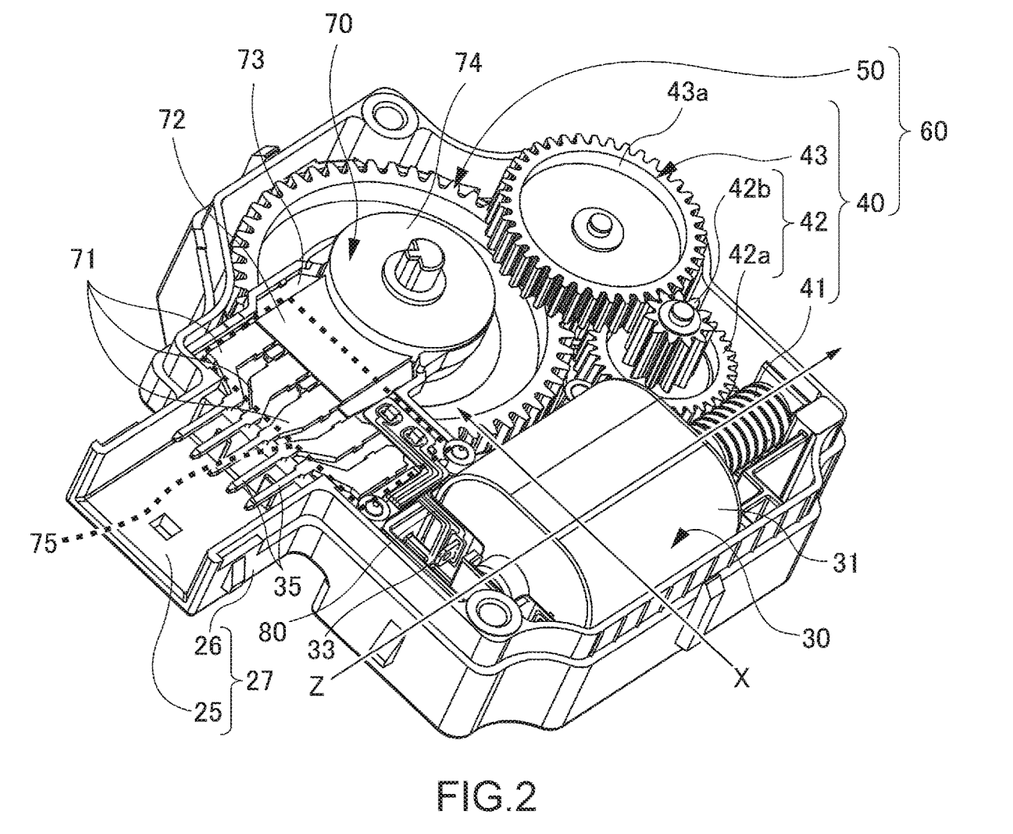
FIG. 2 is a perspective view of the rotary apparatus of the embodiment of the present disclosure with a first housing of the rotary apparatus being removed.
Figure 3:
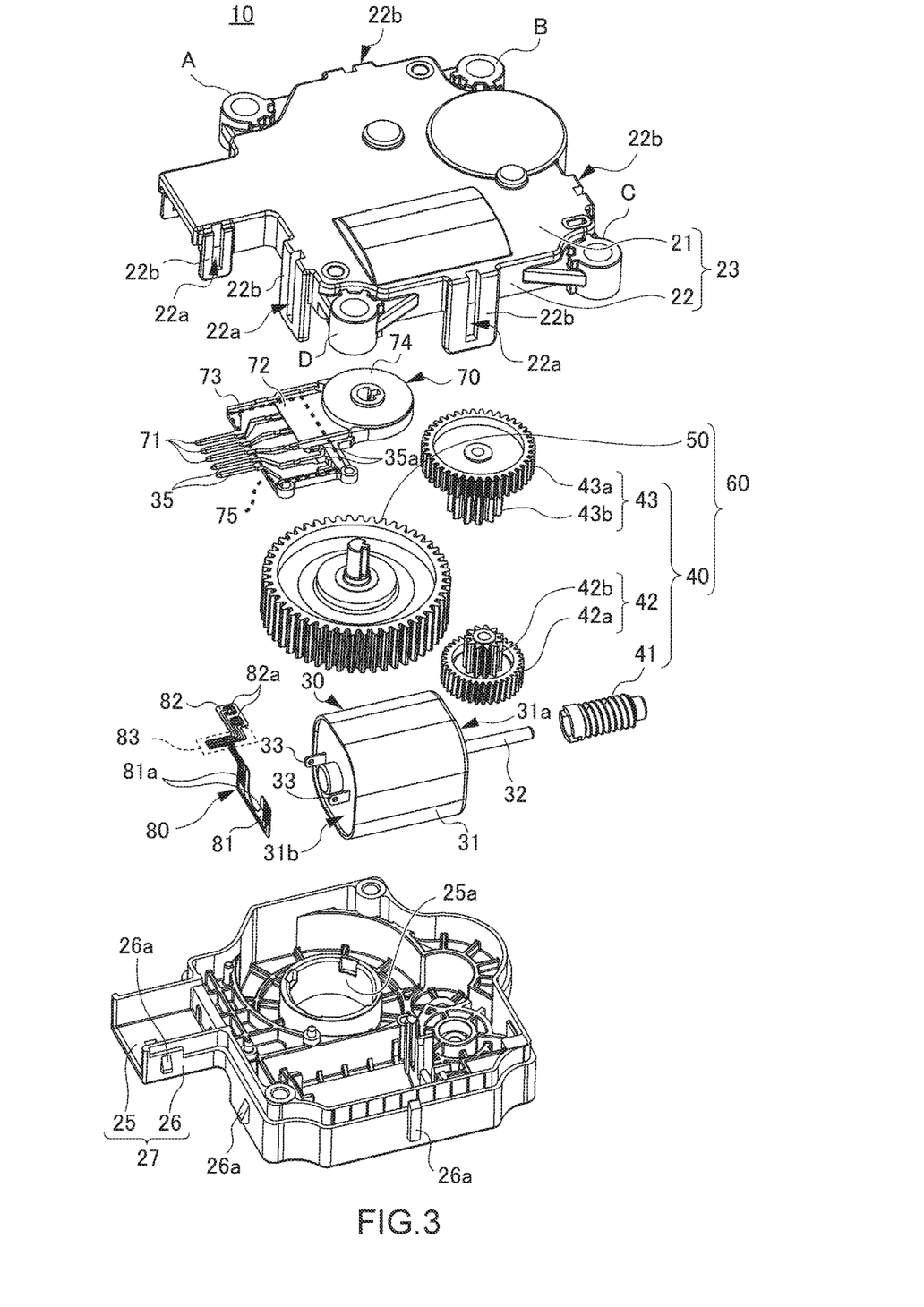
FIG. 3 is an exploded perspective view of the rotary apparatus of the embodiment of the present disclosure.

FIG. 1 is a perspective view of a rotary apparatus 10 of an embodiment of the present disclosure. FIG. 2 is a perspective view of the rotary apparatus 10 with a first housing 23 removed. FIG. 3 is an exploded perspective view of the rotary apparatus 10.

As illustrated in FIG. 1, the rotary apparatus 10 includes a housing 20 formed by coupling a first housing 23 and a second housing 27. The first housing 23 includes a first surface portion 21 as a surface portion and a first sidewall portion 22 provided at an outer peripheral portion of the first surface portion 21. The second housing 27 also further includes a second surface portion 25 as a surface portion and a second sidewall portion 26 provided at an outer peripheral portion of the second surface portion 25.

Note that the housing 20 is formed with a resin material such as polypropylene, polyethylene terephthalate, and ABS resins.

Note that a direction of a rotary shaft is a longitudinal direction of the rotary shaft.

As illustrated in FIG. 3, the first housing 23 includes a plurality of engaging portions 22b formed integrally with the first sidewall portion 22. The engaging portions 22b are provided at an outer periphery of the first sidewall portion 22 and extend toward the second housing 27. The engaging portions 22b are provided with engaging holes 22a, respectively.

In addition, as illustrated in FIG. 3, the second housing 27 includes a plurality of engaging projections 26a that are formed integrally with the second sidewall portion 26. The engaging projections 26a are provided at an outer periphery of the second sidewall portion 26. The engaging projections 26a are configured to engage with the corresponding engaging holes 22a of the engaging portions 22b of the first housing 23.

The first housing 23 is joined with the second housing 27 by engaging the engaging projections 26a of the second housing 27 with the engaging holes 22a of the engaging portions 22b of the first housing 23, thereby integrating the first housing 23 with the second housing 27. In this manner, the housing 20 (see FIG. 1) that is configured to accommodate various parts illustrated in FIGS. 2 and 3 is provided.

Note that, in the present embodiment, the first housing 23 includes the engaging portions 22b having the engaging holes 22a and the second housing 27 includes the engaging projections 26a, but may be configured such that the second housing 27 includes the engaging portions and the first housing 23 includes the engaging projections.

In addition, as illustrated in FIG. 3, at an outer periphery of the first housing 23, a plurality of attaching portions A, B, C, and D for attaching the rotary apparatus 10 to the air conditioning system are provided.

As illustrated in FIGS. 2 and 3, as various parts accommodated in the housing 20 (see FIG. 1), the rotary apparatus 10 includes a motor 30, a plurality of gears 60 including an output gear 50 mechanically rotating the rotary shaft 32 (see FIG. 3) of the motor 30 to the outside, and a sensor 70 capable of detecting a rotation angle of the output gear 50.

In addition, as illustrated in FIG. 3, the second housing 27 includes an opening portion 25a located at a portion corresponding to the center side of the output gear 50.

Figure 4:
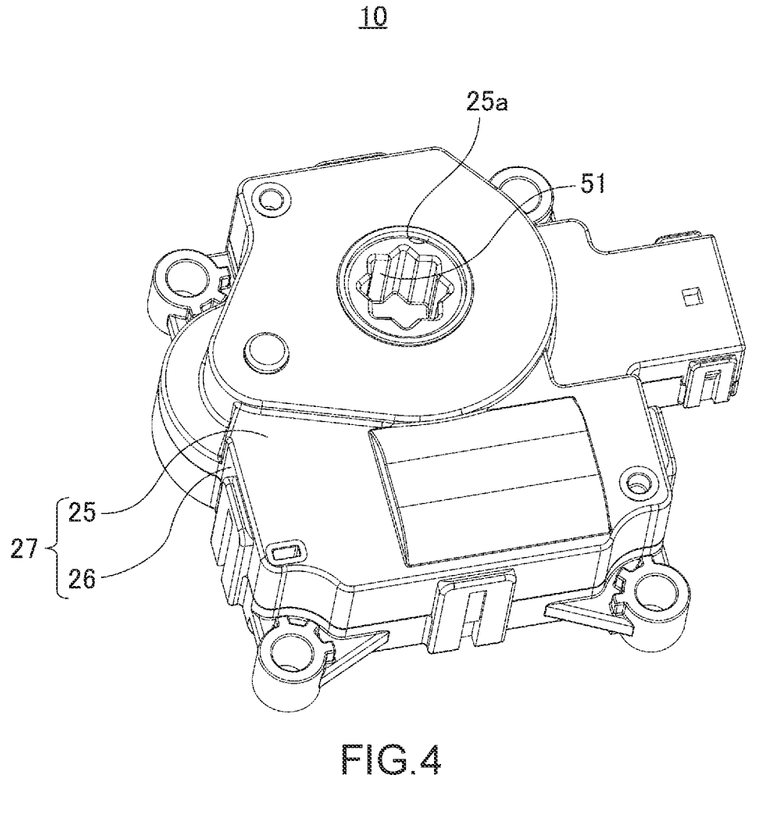
FIG. 4 is a perspective view of the rotary apparatus of the embodiment of the present disclosure illustrating a second surface portion side of a second housing thereof.

FIG. 4 is a perspective view of the rotary apparatus 10 in which the second surface portion 25 side of the second housing 27 of the rotary apparatus 10 is viewable.

As illustrated in FIG. 4, the engaging portion 51 of the output gear 50 is accessible from outside through an opening portion 25a provided in the second surface portion 25 of the second housing 27. For example, a drive shaft, not shown, of a louver of an air conditioning system provided in a vehicle such as a car can be engaged with the engaging portion 51 of the output gear 50.

Thus, by rotating the output gear 50, the louver, not shown, provided in an air passage (hereinafter may also be referred to as an air flow path) of the air conditioning system is controlled, and, for example, the air passage of the air conditioning system is controlled to a predetermined opening degree.

(Motor)

The motor 30 is a drive device for rotating the output gear 50. In the present embodiment, a DC motor is used as the motor 30.

As illustrated in FIG. 3, the motor 30 includes a main body portion 31 having a quadrangular prism outer shape with curved corner portions, a rotary shaft 32 derived from a first end surface 31a of the main body portion 31, and a pair of motor terminals 33 located on an opposite side of the first end surface 31a of the main body portion 31 and provided so as to project outward from a second end surface 31b facing the first end surface 31a.

Note that the rotary shaft 32 is fixed to a rotor housed in the main body portion 31 of the motor 30.

(Transmission Gear)

As illustrated in FIGS. 2 and 3, the plurality of gears 60 includes a transmission gear 40. The transmission gear 40 is a gear for transmitting the rotation of the rotary shaft 32 of the motor 30 to the output gear 50 at a predetermined gear ratio. In the present embodiment, three gears (a worm gear 41, a first two-stage gear 42, and a second two-stage gear 43) are used as the transmission gear 40.

More specifically, as illustrated in FIG. 2, the transmission gear 40 includes the worm gear 41 fixed to the rotary shaft 32 (see FIG. 3) of the motor 30, the first two-stage gear 42, and the second two-stage gear 43. The first two-stage gear 42 includes a large diameter gear 42a meshing with the worm gear 41 and a small diameter gear 42b. The second two-stage gear 43 includes a large diameter gear 43a meshing with the small diameter gear 42b in the first two-stage gear 42 and a small diameter gear 43b (see FIG. 3) meshing with the output gear 50.

Note that, in the present embodiment, the first two-stage gear 42 and the second two-stage gear 43 are used so as to transmit the rotation of the rotary shaft 32 of the motor 30 to the output gear 50 by adjusting the gear ratio using the limited space. However, another design may be used. For example, the second two-stage gear 43 may be omitted, and instead the output gear 50 may be meshed with the small diameter gear 42b of the first two-stage gear 42. Yet another design may be used. For example, the first two-stage gear 42 and the second two-stage gear 43 may be omitted, and instead meshed with the output gear 50 directly to the worm gear 41.

(Output Gear)

As described above, the output gear 50 is a gear meshing with a drive shaft, not shown, of a louver of an air conditioning system and outputting the rotation of the rotary shaft 32 of the motor 30 as a drive force for controlling the drive shaft of the louver.

Note that the present embodiment is not limited to an embodiment in which the drive shaft of the louver, not shown, is directly meshed with the output gear 50, but instead a gear interposed between the rotary apparatus 10 and the drive shaft of the louver, not shown, may be provided. In this case, the rotary shaft of the interposed gear meshes with the output gear 50.

(Sensor)

For example, an air conditioner or the like installed in a car is provided with a louver.

In order to perform drive control on the louver, not shown, to a predetermined state, it is particularly necessary to control the rotation angle of the output gear 50. The sensor 70 is a sensor for detecting the rotation angle of the output gear 50 to control the rotation angle of the output gear 50.

Then, rotation control is performed on the motor 30 based on the detected rotation angle of the output gear 50, whereby the output gear 50 is rotated such that the louver, not shown, comes to a predetermined state.

In the present embodiment, a rotary resistive position sensor is used as the sensor 70. As illustrated in FIGS. 2 and 3, the sensor 70 includes three first connection terminals 71 for input and output to obtain a rotation angle signal corresponding to the rotation angle of the output gear 50, a resistor substrate 72, a rotary body (not shown), a base portion 73, and a cover portion 74. The resistor substrate 72 includes a resin substrate and a resistor printed on the resin substrate. The resistor is electrically connected to the first connection terminals 71. The rotary body (not shown) has a conductive brush (not shown) in contact with the resistor and detects the rotation angle integrally with the output gear 50. The above components are at the base portion 73. The cover portion 74 is disposed at a position corresponding to the rotary body, not shown, and forming a housing (hereinafter referred to as a sensor housing) of the sensor together with the base portion 73.

The resin substrate of the resistor substrate 72 is formed with, for example, an epoxy-based resin.

The resin substrate has a thickness of, for example, about 300 μm to about 1600 μm.

The resin substrate is harder than the flexible wiring board 80.

In the present embodiment, a resistive position sensor is used. The resistive position sensor includes a rotary body, not shown. The rotary body is rotatably provided at the base portion 73. The rotary body is engaged with the rotary shaft of the output gear 50 and rotates integrally with the output gear 50. The rotary body includes a conductive brush, not shown, located on the resistor substrate 72 side. The resistor substrate 72 is disposed above the rotary body so as to be spaced apart therefrom. As the rotary body rotates, the conductive brush changes its position while contacting the resistor of the resistor substrate 72. In this manner, the resistance value that is output from the sensor changes. A sensor that detects the rotation angle is not limited to the above sensor, but may be a sensor of a type in which a sensor substrate having a conductive portion formed thereon to allow the conductive brush to repeat ON-OFF operation in accordance with the rotation of the rotary body, and to detect the rotation angle from the number of ON-OFF operations.

As indicated by a dotted line frame, the base portion 73 includes a terminal arrangement portion 75 for arranging terminals. The terminal arrangement portion 75 includes not only the three first connection terminals 71 for input and output of the sensor 70, but also the two second connection terminals 35 for the motor 30.

More specifically, as illustrated in FIG. 2, the output gear 50 and the sensor 70 are lined in a direction (X-axis direction) substantially orthogonal to a direction (Z-axis direction) of the rotary shaft 32 of the motor 30 and substantially parallel to the second surface portion 25 of the second housing 27. The base portion 73 of the sensor 70 is arranged so as to place the second connection terminals 35 for the motor 30 in the terminal arrangement portion 75. Thus, a part of the terminal arrangement portion 75 is formed so as to project toward the motor 30 from the sensor 70.

The terminal arrangement portion 75 is arranged in such a manner that the first connection terminals 71 are disposed at a position farther from the motor 30 and the second connection terminals 35 are disposed at a position closer to the motor 30 such that the motor terminals 33 of the motor 30 and the second connection terminals 35 for the motor 30 can be electrically connected at a short distance.

As used herein, electrical connection means to electrically connect the two members directly or via other members.

As described above, the base portion 73 of the sensor 70 is configured such that not only the three first connection terminals 71 for input and output of the sensor 70 can be fixed to the base portion 73 but also the two second connection terminals 35 for the motor 30 can be fixed to the base portion 73. This configuration eliminates the need for providing a fine structure for fixing the two second connection terminals 35 for the motor 30 to the housing 20 (see FIG. 1), and thus the mold and the like for molding the housing 20 can be prevented from becoming complicated, and the cost of manufacturing the housing 20 can be reduced.

Instead, it is necessary that the terminal arrangement portion 75 of the base portion 73 of the sensor 70 be configured such that the two second connection terminals 35 for the motor 30 can be disposed in the terminal arrangement portion 75.

However, as is clear from FIGS. 2 and 3, in order to allow the two second connection terminals 35 to be disposed therein, the terminal arrangement portion 75 only needs to be designed to extend toward the motor 30. This design does not complicate the mold and the like for molding the base portion 73, and thus can prevent an increase in manufacturing cost, and can suppress the manufacturing cost from the viewpoint of total product cost.

In the present embodiment, the first connection terminals 71 and the second connection terminals 35 are fixed to the terminal arrangement portion 75 of the base portion 73 of the sensor 70 by a fixing mean such adhesive or the like. Alternatively, for example, projections corresponding to the terminals (the first connection terminals 71 and the second connection terminals 35) may be formed on the terminal arrangement portion 75, and a hole portion corresponding to each of the projections may be formed in each of the terminals (the first connection terminals 71 and the second connection terminals 35).

In this case, the projections of the terminal arrangement portion 75 are press-fit into the respective hole portions of the terminals (the first connection terminals 71 and the second connection terminals 35) to fix the terminals to the terminal arrangement portion 75.

Even in a case where such fixing is performed, it is only necessary to form the projections on the flat terminal arrangement portion 75, which does not complicate the mold and the like for molding the base portion 73 and can prevent an increase in manufacturing cost.

Note that by arranging the second connection terminals 35 in the base portion 73, the second connection terminals 35 can be prevented from contacting the parts accommodated in the housing 20 (see FIG. 1) and reliability can be improved.

Note also that by collectively arranging the three first connection terminals 71 for input and output of the sensor 70 and the two second connection terminals 35 for the motor 30 on the base portion 73, a storage of the terminal can be prevented from becoming complex and the size of the entire rotary apparatus 10 can be reduced.

The two second connection terminals 35 for the motor 30 are placed and fixed to the terminal arrangement portion 75 of the base portion 73, and electrically connected to the respective motor terminals 33 of the motor 30 by the flexible wiring board 80.

The flexible wiring board 80 has a structure that an adhesive layer is formed on a film (resin substrate) having a thickness of, for example, about 12 μm to 50 μm and a conductor having a thickness of, for example, about 12 μm to about 50 μm is printed or laminated on the adhesive layer.

The film is formed with an insulating resin material such as polyimide or polyester.

The conductor is formed with a metal material such as copper.

The adhesive layer is formed with an epoxy resin or an acrylic resin.

Even if bent at an angle of 90 degrees or more, the flexible wiring board 80 can be restored to its original form, a form before the bending.

The electrical connection between the second connection terminals 35 for the motor 30 and the motor terminals 33 may be a connection using a lead wire.

In the case of using a lead wire, the lead wire itself is thin and difficult to handle. Thus, as in the present embodiment, it is preferable to use the flexible wiring board 80, since it is easy to handle.

Thus, by providing electrical connection between the second connection terminals 35 for the motor 30 and the motor terminals 33 by use of the flexible wiring board 80, the assembly work of the rotary apparatus 10 can be facilitated and the manufacturing cost can be reduced.

Further, according to the present embodiment, the shape or the like of the flexible wiring board 80 is modified to improve the reliability of the connection between the second connection terminals 35 for the motor 30 and the flexible wiring board 80 as well as the connection between the motor terminals 33 and the flexible wiring board 80. This will be described below with reference to FIGS. 3 and 5.

Figure 5:
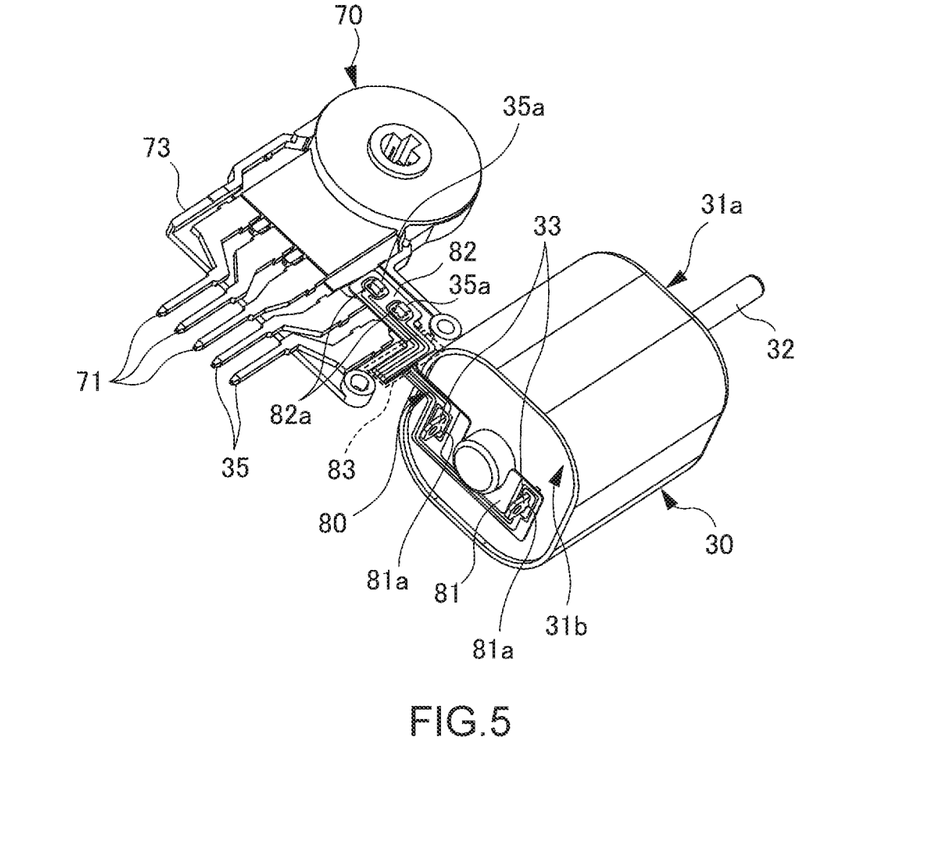
FIG. 5 is a perspective view illustrating a state in which a motor terminal of a motor of the embodiment of the present disclosure and a second connection terminal for the motor provided in a sensor are connected by a flexible wiring board.

FIG. 5 is a perspective view illustrating a state in which the motor terminals 33 of the motor 30 and the second connection terminals 35 for the motor 30 provided in the sensor 70 are connected by a flexible wiring board 80.

As illustrated in FIGS. 3 and 5, the second connection terminal 35 for the motor 30 has a connection portion 35a extending away from the base portion 73. A part on an end portion of second connection terminal 35 side is a bent portion bent in a direction away from the base portion 73.

In the illustrated example, the connection portion 35a extends from the base portion 73 toward the first surface portion 21 of the housing 20.

The flexible wiring board 80 includes one end surface 82 connected to the connection portions 35a of the second connection terminals 35 for the motor 30. At the one end surface 82, an electrical connection portion is provided. The electrical connection portion has a hole portions 82a engaged with the connection portions 35a.

Accordingly, by engaging the connection portions 35a with the hole portions 82a and soldering the connection portions 35a and the hole portions 82a, electrical connection can be ensured. Thus, a connection failure between the connection portions 35a and the hole portions 82a can be suppressed.

In addition, the flexible wiring board 80 includes another end surface 81 connected to the motor terminals 33 of the motor 30. The other end surface 81 also includes an electrical connection portion having hole portions 81a. The hole portions 81a engage with the motor terminals 33.

Accordingly, by engaging the motor terminals 33 with the hole portions 81a and soldering the motor terminals 33 and the hole portions 81a, electrical connection can be ensured. Thus, a connection failure between the motor terminals 33 and the hole portions 81a can be suppressed.

In addition, the flexible wiring board 80 includes an intermediate surface that connects the one end surface 82 connected to the connection portions 35a of the second connection terminals 35 of the motor 30 and the other end surface 81 connected to the motor terminals 33 of the motor 30. The intermediate surface includes a replicated portion 83 arranged such that the one end surface 82 is substantially orthogonal to the other end surface 81. As illustrated in FIG. 3, the replicated portion 83 is a replicated portion provided with a folded structure.

Note that the replicated portion 83 may include a curved structure therein instead of the folded structure.

Note that in the illustrated example, the direction in which the one end surface 82 extends is crossed with the direction of extension of the other end surface 81 by means of the replicated portion 83.

This replicated portion 83 is interposed between the second connection terminals 35 and the motor terminals 33 of the motor 30. The angle (bending angle) formed by the one end surface 82 and the other end surface 81 is changed in response to vibration or the like and exhibits a spring property.

For example, in a case where the second connection terminals 35 of the motor 30 are linearly connected to the motor terminals 33 of the motor 30 by the flexible wiring board 80, vibration of the motor 30 or the sensor 70 due to vibration or the like of the vehicle causes tensile stress or the like to be easily applied to a connection portion between the second connection terminals 35 for the motor 30 and the flexible wiring board 80 as well as a connection portion between the motor terminals 33 and the flexible wiring board 80. As a result, connection failure may occur, or disconnection or the like of the flexible wiring board 80 may easily occur.

In the present embodiment, with the replicated portion 83 having a folded structure being interposed, the second connection terminals 35 of the motor 30 and the motor terminals 33 of the motor 30 are connected by the flexible wiring board 80.

Under this configuration, the replicated portion 83 having the folded structure deforms so as to change the bending angle in response to vibration or the like and exhibit a spring property.

Therefore, with the replicated portion 83, tensile stress or the like can be prevented from being applied to the connection portion between the second connection terminals 35 for the motor 30 and the flexible wiring board 80 as well as the connection portion between the motor terminals 33 and the flexible wiring board 80. Thus, connection failure can be suppressed, and disconnection or the like of the flexible wiring board 80 itself can be suppressed.

Note that that the replicated portion 83 is formed by bending only once with no folded structure. With such a replicated portion, an extra wiring length can be provided and an effect of tensile stress or the like can be reduced in comparison with the linear wiring method. Thus, the replicated portion 83 may be such a replicated portion. However, as in the present embodiment, it is more preferable to use a replicated portion having a folded structure, since the replicated portion 83 having a folded structure can be made less susceptible to tensile stress.

Therefore, as in the present embodiment, providing the replicated portion 83 having a folded structure in the flexible wiring board 80, can improve the reliability of the rotary apparatus 10.

The above described rotary apparatus 10 is used, for example, in an air conditioning system for a vehicle such as an automobile. Hereinafter, the following brief description will focus on an example for use in a vehicle air conditioning system.

Figure 6:
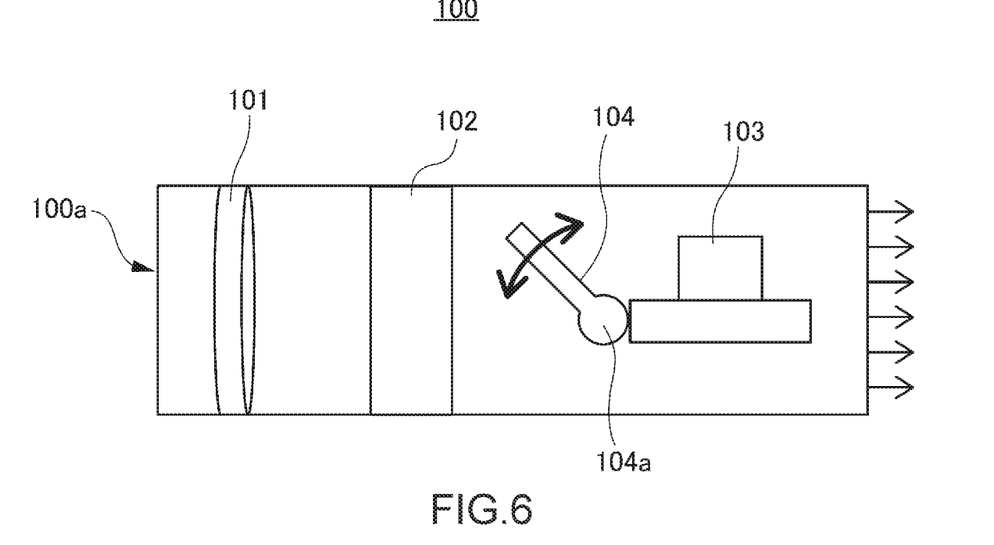
FIG. 6 is a schematic view for illustrating an air conditioning system including the rotary apparatus according to the embodiment of the present disclosure.
Figure 7:
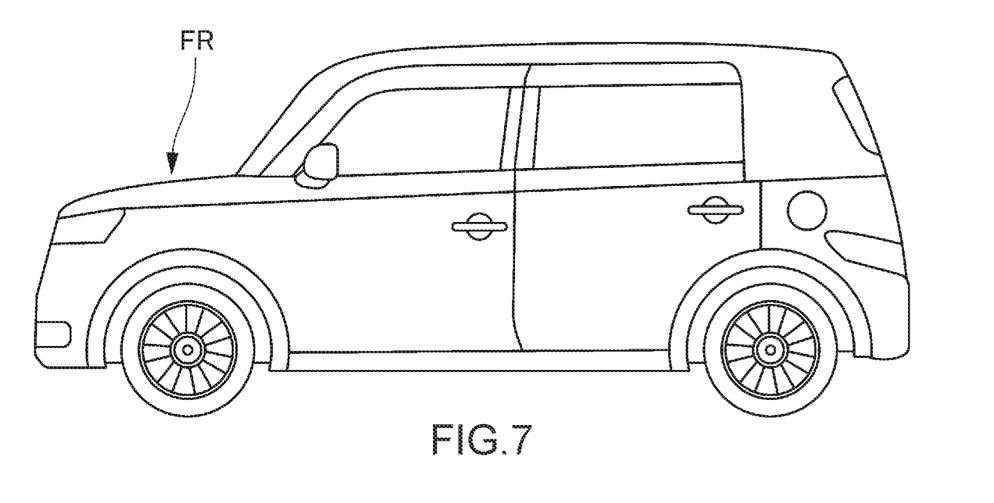
FIG. 7 is a diagram illustrating a vehicle including the air conditioning system shown in FIG. 6.

FIG. 6 is a schematic view for describing an air conditioning system 100 including the rotary apparatus 10 according to the present embodiment. FIG. 7 is a diagram illustrating a vehicle including the air conditioning system 100 in FIG. 6.

As illustrated in FIG. 6, the air conditioning system 100 includes a blower fan 101, an evaporator 102, a heater 103, and a louver 104, which are disposed in a front portion FR (see FIG. 7) of the vehicle.

More specifically, the blower fan 101 is disposed on a side of a suction port 100a of the air conditioning system 100. The evaporator 102 for cooling the air sent out from the blower fan 101 is disposed on the downstream side in the air flow direction.

Further, the heater 103 is disposed closer to the downstream side in the air flow direction than the evaporator 102 and the louver 104 is interposed between the evaporator 102 and the heater 103. The louver 104 controls the amount of air flowing from the evaporator 102 to the heater 103 so as to adjust the air to an appropriate temperature.

Then, the air adjusted to an appropriate temperature passes through a duct or the like and is supplied into the vehicle from an air outlet provided in the vehicle. In the above described air conditioning system 100, for example, a rotary shaft 104a of the louver 104 is connected to an engaging portion 51 (see FIG. 4) of the output gear 50 of the above described rotary apparatus 10.

As described above, the rotary apparatus 10 controls the rotation of the louver 104 to a predetermined state (See double arrow in FIG. 6).

Note that the above described configuration is just an example of the rotary apparatus 10 in the air conditioning system 100. For example, the air conditioning system 100 may switch the air flow path (duct route) between a path for circulating air within the vehicle and a path for introducing air into the vehicle from the outside, in which case the louver is provided in the switching portion.

Therefore, the rotary apparatus 10 may also be used for controlling the louver provided in the switching portion in a suitable manner.

Hereinbefore, the present disclosure has been described with reference to the embodiments. However, the present disclosure is not limited to the embodiments.

The above embodiments have described that the sensor 70 is disposed so as to detect the rotation angle of the output gear 50, but the detection of the rotation angle is not limited to the detection of the output gear 50.

For example, the relationship between the rotation angle of one of a plurality of transmission gears 40 and the drive state of a louver, not shown, is determined. Then, by detecting the rotation angle of the transmission gear by the sensor 70, drive control on the louver, not shown, can be actuated by performing rotation control on the motor 30 based on such a rotation angle.

Accordingly, the sensor 70 for detecting the rotation angle may be a sensor that is configured to detect the rotation angle of the transmission gear 40.

In addition, in the above embodiments, a rotary resistive position sensor is used as the sensor 70, but the sensor 70 is not limited to the rotary resistive position sensor and may be a non-contact rotary position sensor.

Note that the resistive position sensor has a structure in which the conductive brush physically contacts the resistor firmly and is less susceptible to detection failure or the like due to vehicle vibration, and thus the rotary resistive position sensor is suitable for the sensor 70.

In the above embodiment, the rotation angle of the output gear 50 is detected by the sensor. However, it is not limited thereto, and the rotation angle of another gear may be detected by the sensor instead of the rotation angle of the output gear 50 as long as the rotation angle of the output gear 50 can be controlled.

In addition, in the above embodiment, one end of the second connection terminal 35 for the motor 30 is a bent portion, but the bent portion may be interposed between a part of the second connection terminal 35 facing the base portion 73 and the connection portion 35a.

In this case, the connection portion 35a serves as an end portion of the second connection terminal 35.

In addition, the above embodiments have described that the intermediate surface includes the replicated portion 83 located so that the one end surface 82 is substantially orthogonal to the other end surface 81, but without being limited to this, the intermediate surface may include the replicated portion 83 located so that the direction in which the one end surface 82 extends is crossed with the direction of extension of the other end surface 81.

In addition, in the above embodiment, the rotary apparatus 10 is installed in an air conditioner for a vehicle such as a car, but the rotary apparatus 10 is not limited to the use in an air conditioner for a vehicle and may be suitably used, for example, in a vehicle such as an airplane.

Thus, it will be apparent that various modifications can be made without departing from the spirit and scope of the present disclosure. Such various modifications made within the spirit and scope of the present disclosure are also included in the technical scope of the present disclosure. This is apparent to those skilled in the art from the scope of claims.

What is claimed is:

1. A rotary apparatus comprising:
a motor including a motor terminal;
a plurality of gears;
a sensor configured to detect a rotation angle of one of the plurality of gears; and
a flexible wiring board, wherein
the sensor includes a first connection terminal electrically connecting to the outside, and a base portion,
the first connection terminal is disposed at the base portion, a second connection terminal electrically connecting the motor is disposed at the base portion, the second connection terminal including a connection portion extending in a direction away from the base portion, the flexible wiring board electrically connects with the motor terminal and the second connection terminal, the flexible wiring board includes:

one end surface connected to the connection portion of the second connection terminal;

other end surface connected to the motor; and an intermediate surface connecting the one end surface to the other end surface, the intermediate surface having a replicated portion, the replicated portion is interposed between the second connection terminal and the motor terminal, the replicated portion deforms and changes an angle formed by the one end surface and the other end surface and exhibits a spring property, the direction of extension of the one end surface is crossed with the direction of extension of the other end surface by the replicated portion, and the replicated portion includes a folded structure or a curved structure.

2. The rotary apparatus according to claim 1, wherein the motor is a DC motor, and the plurality of gears includes a transmission gear transmitting the rotation of the motor to the one of the plurality of gears.

3. The rotary apparatus according to claim 1, wherein the base portion includes a terminal arrangement portion, wherein the first connection terminal and the second connection terminal are arranged at terminal arrangement portion.

4. The rotary apparatus according to claim 1, wherein the connection portion of the second connection terminal extends in a direction away from the base portion, and the flexible wiring board includes an electrical connection portion having a hole portion engaged with the connection portion.

5. The rotary apparatus according to claim 4, wherein the connection portion is a bent portion, the bent portion is a part in an end part side of the second connection terminal, and the part in the end part side is bent in a direction away from the base portion.

6. The rotary apparatus according to claim 1, wherein the sensor includes:

a resistor substrate;

a resistor formed at the resistor substrate and electrically connected to the first connection terminal;

a rotary body rotatable together with the plurality of gears;

a conductive brush provided at the rotary body and contacting the resistor; and a cover portion opposing the rotary body and forming a sensor housing together with the base portion.

7. The rotary apparatus according to claim 3, wherein the one of the plurality of gears is an output gear, the output gear and the sensor are lined in a direction substantially orthogonal to a direction of a rotary shaft of the motor, and the terminal arrangement portion includes the first connection terminal disposed at a position away from the motor and the second connection terminal disposed at a position close to the motor.

8. The rotary apparatus according to claim 1, comprising a housing accommodating the motor, the plurality of gears, and the sensor.

9. A vehicle comprising:

an air conditioning system including:

a rotary apparatus according to claim 1; and a louver controlled by the rotary apparatus.

* * * * *